Patented Dec. 18, 1951

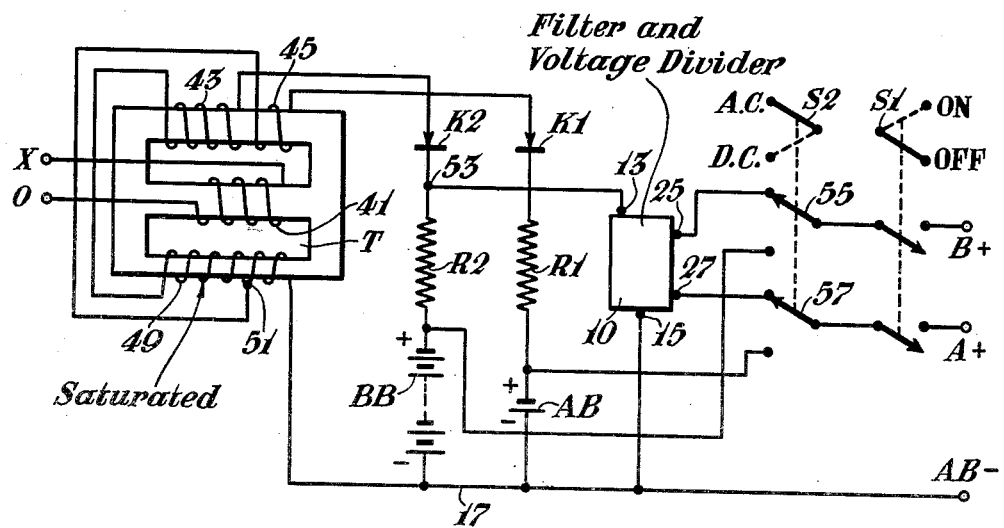

2,579,313

UNITED STATES PATENT OFFICE 2,579,313

POWER SUPPLY MEANS

Robert M. Gilson, Swissvale, and Linnie K. Hedding, Wilkinsburg, Pa., assignors to Westinghouse Air Brake Company, a corporation of Pennsylvania Original application November 20, 1947, Serial No. 787,248. Divided and this application February 1, 1949, Serial No. 74,022

2 Claims. (Cl. 171—97)

Our invention relates to power supply means, and particularly to power supply means for charging primary batteries or storage batteries of the type employed in portable radio units.

This application is a division of our copending application, Serial No. 787,248, filed November 20, 1947, for Power Supply Means, now Patent No. 2,490,427, issued December 6, 1949.

The chemical action which takes place in a dry cell when energy is supplied thereto is not fully understood, and in this disclosure, the term charging when applied to a dry cell battery will be understood to mean the restoration of the battery to or near its initial condition by passing current through the battery in the reverse direction. Also, the term normal voltage of a battery is here used to mean the voltage of the battery at its initial condition or slightly above that value as found necessary to bring the battery to its fully charged or reconditioned state.

It has heretofore been proposed to provide portable radio receivers with apparatus arranged so that the receiver may operate either from self-contained batteries, or from an available source of alternating current by the use of rectifiers. The batteries used in such arrangements may be of the dry cell type and it has been proposed to recharge them but this process requires careful regulation of the charging current, since an overcharge or an excessive charging current will ruin the battery.

Accordingly, it is an object of this invention to provide power supply means which may be employed in portable radio units and the like for charging primary or storage batteries associated with such a unit.

Another object of our invention is to provide a direct current power supply means for a portable radio unit which may be selectively employed to operate the unit or to charge the battery associated with the unit.

A further object of our invention is to provide a direct current power supply for a portable radio receiver which may be employed to operate the receiver and simultaneously charge the batteries associated with the receiver.

Another object of our invention is to provide a power supply means for charging dry cell batteries and wherewith the charge is automatically regulated to prevent overcharging the batteries.

Another object of this invention is to provide an improved type of power supply means.

Other objects of our invention and features of novelty will be apparent from the following description taken in conjunction with the accompanying drawings.

In practicing our invention we provide rectifiers of the dry disc type which may be supplied with alternating current energy from a transformer which is arranged to have a variable reluctance governed by the voltage supplied to the transformer and arranged so that the output voltage is held substantially constant, or the rectifiers may be supplied with energy directly from an alternating current source under certain conditions. By appropriate switching means, the direct current energy supplied from the rectifiers is supplied either directly to an associated load, such as, for example, a radio receiver through appropriate filtering circuits or to the primary or storage batteries associated with the load. Additionally, the switching means provides for the connection of the batteries directly to the load for operation thereof.

We shall describe one form of power supply means embodying our invention and shall then point out the novel features thereof in claims.

The accompanying drawing is a diagrammatic view showing power supply means embodying our invention when used with a portable radio receiver.

Referring to the drawing, there is shown an arrangement which may be employed where it is desired to provide a higher degree of voltage regulation. As shown, transformer T is provided with a primary winding 41 mounted on one leg of the transformer core, and provided with terminals X and O. Two regulating windings 43 and 45 are mounted on a third leg of the core of transformer T, while a second leg of transformer T is constructed and proportioned so that under conditions of normal voltage, this second leg of the transformer is saturated. On the second leg of the transformer is mounted a secondary winding 49, having a low voltage tap 51. The circuits are arranged so that during the time when the radio receiver is being operated by alternating current supplied to terminals X and O, or when the supply of energy to the radio receiver is cut off but the supply of alternating current is continued to terminals X and O, the batteries BB and AB are charged by energy supplied through rectifiers K1 and K2, while the switching means also provides for the connection of batteries AB and BB directly to the radio receiver circuit.

In accordance with usual practice, the reference characters B(+), A(+), and AB(−) designate the positive high voltage terminal, the positive low voltage terminal, and the common terminal, respectively of the circuits of the radio receiver, not shown, for which the apparatus of the drawing forms the power supply means. The batteries AB and BB are the low and high voltage batteries which may be either of the primary or storage type, and preferably are of the dry cell type.

In describing the operation of the apparatus, it will be assumed that the receiver is to be operated by alternating current and accordingly, switch S2 is operated to its uppermost position designated by the reference character AC, and switch S1 is operated to its "on" position.

When alternating current energy from a suitable source is supplied to terminals X and O, the energy flows through primary winding 41 of transformer T, and induces an alternating current in secondary winding 49 which is mounted on the saturated leg of the core. Since the flux in the leg of the core on which secondary winding 49 is mounted is at its saturation point, it will be apparent that an increase in the voltage of the energy supplied to primary winding 41 will cause an increase in the flux in the core, but the voltage of the energy induced in secondary winding 49 will not be increased appreciably, as the leg of the core is already at its point of saturation.

As a result, when the voltage in primary winding 41 of transformer T increases, the voltage induced in secondary winding 49 of transformer T is increased by a much smaller amount.

The low voltage battery AB is supplied with energy at this time by a circuit which may be traced from tap 51 on sceondary winding 49 of transformer T through regulating winding 45 on the third leg of the core of transformer T, through half-wave rectifier K1, and through resistor R1 to the positive terminal of battery AB, and from the negative terminal of battery AB over the common connection 17 to the right-hand end of the secondary winding 49 of transformer T.

The circuit for supplying half-wave rectified current to the high voltage battery BB may be traced from the left-hand terminal of the secondary winding 49 of transformer T, through regulating winding 43 on the third leg of the transformer core, through half-wave rectifier K2, and through resistor R2 to the positive terminal of battery BB, and from the negative terminal of battery BB to the common connection 17 and thence to the terminal at the right-hand end of the secondary winding 49 of transformer T. Additionally, energy is supplied to the filter and voltage divider 10 at this time by a circuit which may be traced from a terminal 53 between rectifier K2 and resistor R2, through the filter and voltage divider 10 to the common-connection 17 and thence to the right-hand end of the winding 49 of transformer T. It will be seen therefore that the filter and voltage divider 10 are connected in multiple with resistor R2 and battery BB, so that half-wave rectified current is supplied at this time to both the battery BB and the filter and voltage divider 10 through half-wave rectifier K2.

After the energy has been filtered and divided by the filter and voltage divider 10, it is supplied from terminals 25 and 27 to contacts 55 and 57 of switch S2 in their uppermost position, and through the contacts of switch S1 to the terminals A(+) and B(+) of the radio receiver, and thence to the negative terminal AB(−) and through the common connection 17 to the filter and voltage divider 10.

Accordingly, it will be seen that our invention provides for operating the radio receiver by means of energy supplied from an alternating current source, while at the same time the primary or storage batteries associated with the portable receiver are being charged.

As previously explained, the voltage of the energy induced in secondary winding 49 of transformer T is held substantially constant despite variations in the voltage of the energy supplied to primary winding 41. The regulating windings 43 and 45 on the third leg of the transformer are arranged so that the voltage developed therein tends to oppose the voltage developed in secondary winding 49, so that upon an increase of voltage in primary winding 41, the increase in flux flowing through the third leg of the transformer core will cause an increase in the opposing voltage induced in regulating windings 43 and 45, with the result that the tendency for the output voltage of secondary winding 49 to rise is balanced by the increase in the opposing voltage developed by regulating coils 43 and 45, so that a further regulating action is obtained by the use of these coils over what would be obtained by the use of the secondary winding 49 alone.

Since the voltage of the energy induced in secondary winding 49 is held substantially constant, it will be apparent that as the voltage of batteries BB and AB approach their normal value as the batteries charge, the amount of current flowing therethrough will become less and less, until at the time when the voltage of the batteries reaches the voltage of the energy supplied from secondary winding 49 the current will be diminished to zero, and therefore it will be seen that a taper charging effect is obtained, so that the amount of energy supplied through the batteries is reduced as the voltage of the batteries increases.

When it is desired to operate the radio receiver from the batteries, switch S2 is operated to its lowermost position designated by the reference character DC, and contacts 55 and 57 of switch S2 in their lowermost position establish connections from the positive terminals of batteries BB and AB to the terminals B(+) and A(+), respectively, of the radio receiver, while since the negative terminals of batteries AB and BB are connected to the common lead 17 which in turn is connected to the common terminal AB(−), a circuit is now complete for supplying energy from the batteries to the radio receiver.

It is to be understood that our invention is not limited in its use to portable radio receivers and that this one application illustrates one of the many places in which power supply means embodying our invention is useful.

Although we have herein shown and described only one form of power supply means embodying our invention, it is to be understood that various changes and modifications may be made therein within the scope of the appended claims without departing from the spirit and scope of our invention.

Having thus described our invention, what we claim is:

1. In power supply means, the combination comprising, a pair of input terminals to which an alternating voltage can be supplied, a transformer provided with a magnetizable core having three parallel legs, a primary winding mounted on the middle leg of said core and connected across said pair of input terminals, a secondary winding mounted on a selected one of the outside legs of said core, said selected outside leg being proportioned to be saturated by magnetic flux with an alternating voltage of a given normal value supplied to said input terminals, a regulating winding mounted on the other outside leg of said core, said other outside leg being proportioned to be non-saturated with alternating voltage of said given normal value supplied to said input terminals, a pair of load terminals which require a substantially constant alternating voltage, said secondary winding and said regulating winding connected in series across said pair of load terminals, and said regulating winding connected for the voltage developed across that winding due to the flux created by the primary winding to oppose the voltage developed across said secondary winding, whereby the effects of an increase in flux in said core when the alternating voltage supplied to said input terminals exceeds said given value are neutralized and the voltage supplied to said load terminals is retained at said required value.

2. In power supply means, the combination comprising, a pair of input terminals to which an alternating voltage that may vary from a given normal value may at times be supplied, a transformer having a three-legged magnetic core structure and provided with a primary winding which is mounted on a first one of said legs and connected across said input terminals, a secondary winding mounted on a second one of said legs, said second leg being proportioned to be saturated by magnetic flux with alternating voltage of said given normal value supplied to said input terminals, a first and a second regulating winding mounted on a third one of said legs, said third leg being proportioned to be non-saturated when alternating voltage of said given normal value is supplied to said input terminals, a first and a second pair of load terminals which require a substantially constant given high load voltage and a given low load voltage respectively, a first circuit including the full portion of said secondary winding and said first regulating winding in series opposing connected across said first pair of load terminals, and a second circuit including a selected portion of said secondary winding and said second regulating winding in series opposing connected across said second pair of load terminals, whereby the effects of an increase in flux in said core when the alternating voltage supplied to said input terminals exceeds said given normal value are neutralized and the voltages supplied to said first and second pair of load terminals are retained at said high and low load voltages respectively.

ROBERT M. GILSON.
LINNIE K. HEDDING.

REFERENCES CITED

The following references are of record in the file of this patent:

UNITED STATES PATENTS

| Number | Name | Date |
| --- | --- | --- |
| 2,222,196 | Vilkomerson | Nov. 19, 1940 |
| 2,373,383 | Christopher | Apr. 10, 1945 |
| 2,423,114 | Potter | July 1, 1947 |